United States Patent [19]
Humiston et al.

[11] 3,837,491
[45] Sept. 24, 1974

[54] LIQUID PURIFICATION APPARATUS AND PROCESS

[75] Inventors: Gerald Francis Humiston, South Barre; Barton Lester Cotton, Barre, both of Vt.

[73] Assignee: Pollution Control Inc., South Barre, Vt.

[22] Filed: Nov. 3, 1972

[21] Appl. No.: 303,425

[52] U.S. Cl................ 210/73, 202/236, 202/238, 210/84, 210/179, 210/381
[51] Int. Cl............................................. B01d 33/06
[58] Field of Search................... 202/205, 236, 238; 159/6 W; 210/381, 71, 73, 84, 179, 512

[56] References Cited
UNITED STATES PATENTS

| | | | |
|---|---|---|---|
| 1,664,769 | 4/1928 | Chance | 210/381 X |
| 1,926,546 | 9/1933 | Lampen | 210/512 X |
| 2,977,234 | 3/1961 | Wenzelberger | 210/71 X |
| 3,300,868 | 1/1967 | Anderwert | 159/6 W |
| 3,347,754 | 10/1967 | Thomas | 202/236 X |

*Primary Examiner*—Frank A. Spear, Jr.
*Assistant Examiner*—Robert G. Mukai

[57] ABSTRACT

A method for the continuous mechanical purification of a liquid containing solid and dissolved pollutants includes charging a liquid chamber with polluted liquid and simultaneously subjecting the polluted liquid to centrifugal separation and vacuum distillation. The centrifugal separation effects the removal of said pollutants from the chamber and exposes a greater surface of relatively pure liquid for the vacuum distillation.

The purification apparatus is comprised of a stationary housing, a generally cylindrical and circumferentially perforated screen member concentrically disposed within the housing, and vanes within the screen member mounted for rapid rotation about the axis thereof to cause liquid therein to be centrifuged. Vacuum means for applying vacuum to the liquid within the screen member communicates with the screen member through a vapor outlet in the housing while liquid inlet means and sludge outlet means located in the housing provide, respectively, for the charging of polluted liquid into the screen member and the removal of the sludge from the housing.

7 Claims, 2 Drawing Figures

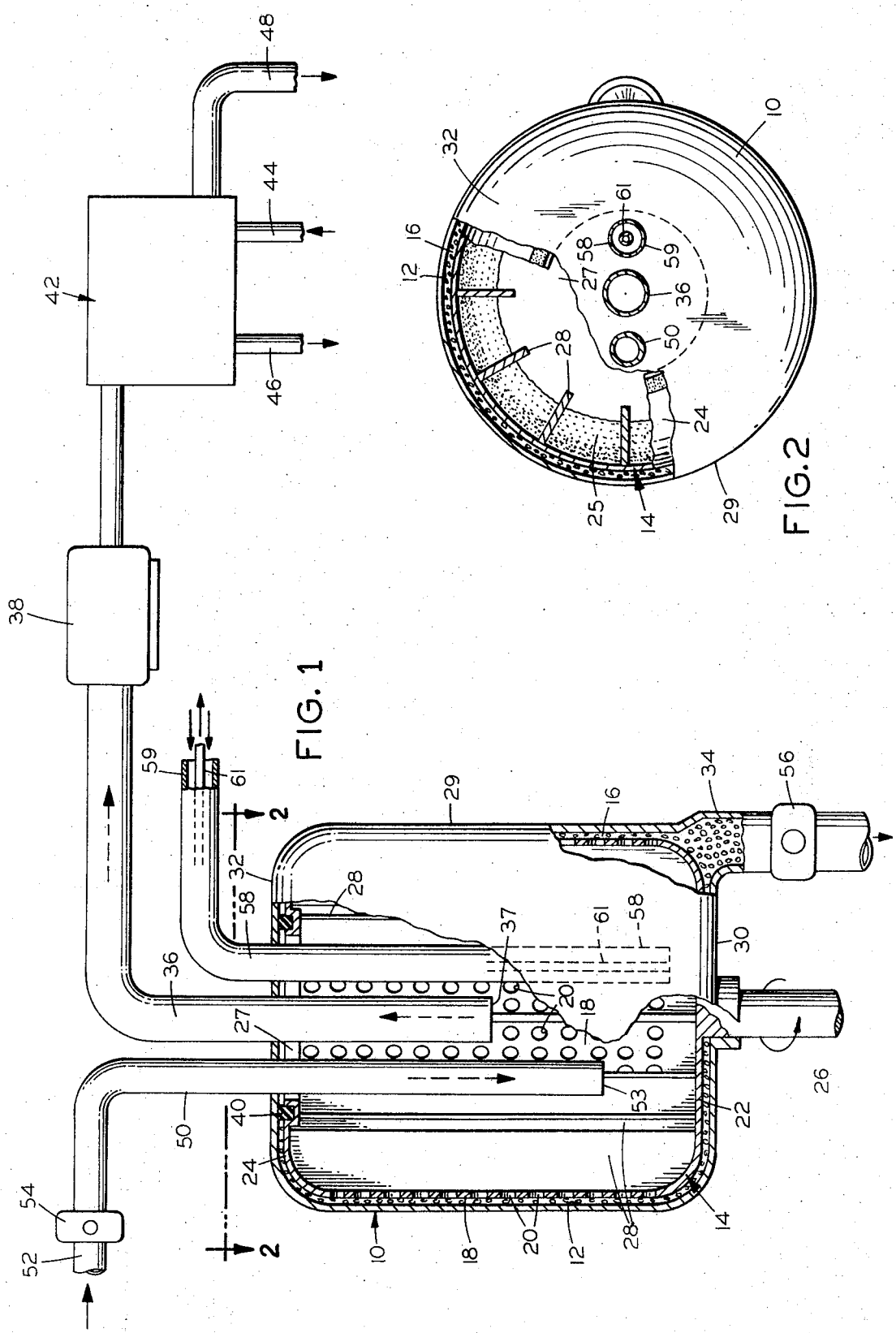

LIQUID PURIFICATION APPARATUS AND PROCESS

BACKGROUND OF THE INVENTION

Current ecological pressures are placing ever-increasing and more stringent demands upon the capabilities of the established liquid purification techniques. Large volumes of polluted liquids (usually water) containing any number of solid and dissolved pollutants must be treated rapidly, efficiently and automatically to produce a relatively pure liquid at minimum unit cost.

While the well-known technique of centrifugal separation is a highly effective technique for removing solids from a polluted liquid, it is not a particularly useful technique for the removal of dissolved pollutants from the liquid and may even promote the retention of the dissolved pollutants therein. In general, centrifugal separation by itself has not been found helpful in the production of such high-purity products as potable water. Another problem associated with the technique is that extremely high levels of centrifugal acceleration require very high speeds of rotation to produce the desired separations within a reasonable period of time.

Vacuum distillation is another technique well known in the art for the purification of polluted liquids, especially where high degrees of purity are desired. Vacuum distillation is often effective in removing dissolved pollutants from the liquid because, as the liquid is continuously evaporated, the dissolved pollutants accumulate and eventually supersaturate out of solution, thereby becoming just one more solid pollutant to be removed. One of the problems encountered with vacuum distillation however, is that large concentrations of solid pollutants interfere with the surface evaporation rates thereby slowing down the process. Another difficulty has been adequately providing for the continuous removal of the solid pollutants remaining after the liquid has been distilled. Another problem associated with the technique has been the difficulty of exposing sufficient liquid surface area to the vacuum to achieve an acceptable rate of evaporation.

Accordingly, it is an object of the present invention to provide a novel process and apparatus for the continuous mechanical purification of a liquid containing solid and dissolved pollutants therein, the novel process and apparatus separating the liquid from the solid and dissolved pollutants on a rapid and economical basis and providing for effective removal of the separated pollutants.

It is also an object to provide such a process and apparatus which are capable of providing a relatively high degree of purity in the liquid product.

Another object is to provide such a process and apparatus which operate at efficient purification rates and provide for the automatic removal of separated pollutants from the processing area.

A further object is to provide such apparatus which may be fabricated relatively simply and durably to provide for long lasting operation.

SUMMARY OF THE INVENTION

It has been found that the foregoing and related objects may be readily attained by a method for the continuous mechanical purification of a polluted liquid wherein the polluted liquid is simultaneously subjected to centrifugal separation and vacuum distillation. More particularly, a liquid chamber is charged with a feedstock liquid containing solid and dissolved pollutants. The polluted liquid within the liquid chamber is subjected to centrifugal acceleration by rapidly rotating the polluted liquid about the axis of the liquid chamber to displace the solid pollutants outwardly and to displace liquid inwardly towards the chamber axis, while simultaneously the displaced liquid is subjected to vacuum distillation by applying a vacuum thereto to produce liquid vapor. The liquid vapor is withdrawn from the liquid chamber and the withdrawn liquid vapor is then condensed as a substantially pure liquid. The sludge comprised of the outwardly displaced solid pollutants is also removed.

It is preferred that the polluted liquid be charged below the liquid level within the liquid chamber and that the polluted liquid within the liquid chamber be heated.

The apparatus for the continuous mechanical purification of a liquid containing solid and dissolved pollutants is comprised basically of a stationary housing having a generally cylindrical sidewall, bottom wall and top wall, and a generally cylindrical screen member substantially concentrically disposed within the housing and of lesser diameter than the inner diameter of the housing sidewall to provide spacing therebetween. The screen member has a perforate sidewall and a substantially imperforate base defining a liquid chamber therewithin. A sludge outlet in the housing adjacent the lower end thereof communicates with the spacing for removal of sludge from within the housing.

Inlet means in the housing communicates with the liquid chamber for substantially continuously charging the liquid chamber with liquid containing solid and dissolved pollutants. A vapor outlet in the housing top wall communicates with the liquid chamber at a point spaced from and inwardly toward the axis of the perforate sidewall, and vacuum means communicates with the vapor outlet for applying and maintaining a vacuum within the liquid chamber.

A plurality of vanes or projections is provided within the liquid chamber, and drive means rapidly rotates at least the vanes about the axis of the screen member to cause the polluted liquid within the liquid chamber to be centrifuged, with the liquid being displaced inwardly within the screen member and the solid pollutants being displaced outwardly within the screen member and thence through the perforate sidewall into the spacing. The solid pollutants are discharged from the spacing into the sludge outlet and the displaced liquid is preferentially exposed to the vacuum generated by the suction means and the vapors therefrom are drawn through the vapor outlet for subsequent condensation. The dissolved pollutants in the displaced liquid remain within the liquid chamber and concentrate therein until supersaturation effects precipitation thereof and displacement outwardly of the liquid chamber.

In the preferred embodiment of the present invention the screen member is mounted for rotation about its axis within the housing, the vanes are affixed to the screen member and extend inwardly from the perforate screen sidewall towards the screen member axis, and the drive means rotates the screen member to rotate the vanes about the screen member axis.

According to the present invention, the solid pollutants are efficiently removed from the liquid as with conventional centrifugal separation, and an extremely pure liquid product is obtained, as with conventional vacuum distillation. Processing occurs at a high rate of speed because of the large surface area of liquid continually being exposed to the vacuum, with the solids being rapidly removed from the vacuum distillation area by the centrifugal action. The dissolved pollutants which supersaturate and precipitate out in the course of the vacuum distillation are removed by the centrifugal separation.

BRIEF DESCRIPTION OF THE DRAWING

FIG. 1 is a fragmentary and partially diagrammatic front elevational view of a purification device embodying the present invention with portions of the housing and screen member being broken away to illustrate internal construction; and FIG. 2 is a sectional view taken along line 2—2 of FIG. 1 with a portion of the housing and screen member being broken away for purposes of clarity of illustration and with a representative top cross-section of the polluted liquid and separated solid pollutants being indicated.

DESCRIPTION OF THE EMBODIMENT

Referring now in detail to the attached drawing, apparatus embodying the present invention includes a stationary housing generally designated by the numeral 10, which is generally cylindrical in shape to define a generally cylindrical cavity 12 therein. Mounted for rotation within the cavity 12 is a generally cylindrical screen member generally designated by the numeral 14, and concentrically disposed within housing 10. The screen member 14 is of lesser diameter than the inner diameter of the housing 10 and also of lesser height so as to be spaced apart therefrom and provide an annular spacing 16 therebetween to receive solids removed from the polluted liquid.

The screen member 14 includes a perforate, cylindrical sidewall 18 providing a plurality of small circular perforations 20 extending substantially over the surface thereof, a closed or imperforate base 22, and a top wall 24 with a relatively large coaxial circular opening 27. The enumerated screen member elements 18, 22 and 24 define therebetween a liquid chamber 25, and screen member 14 is supported within the cavity 12 above the bottom thereof and mounted for rotation about its axis therein by means of a drive shaft 26 connected to the base 22 through the housing 10. Supported by the base 22 and perforate sidewall 18 is a plurality of vanes 28 which extend inwardly from the perforate sidewall 18 towards the chamber axis. The vanes 28 within the liquid chamber 25 are simply radially angled projections capable of engaging the liquid and causing rotation of the liquid within the liquid chamber 25. The vanes 28 of the screen member 14 rotate at high speed, preferably from 1,000 to 50,000 revolutions per minute, to effect centrifugal action within the liquid chamber 25. The liquid within the chamber 25, of course, develops the typical cavitational pattern of centrifuged liquids in a vertical cylinder, adhering to the screen member sidewall 18 at the top of the screen member (as shown in FIG. 2) and completely covering the screen member base 22 at the bottom of the screen member 14.

The housing 10 includes a generally cylindrical sidewall 29, a bottom wall 30 and a top wall 32. Located adjacent the housing bottom wall 30 is a sludge or solids outlet pipe 34 which communicates with the annular spacing 16 between the housing 10 and screen member 14, so that solids or sludge passing radially outwardly from the liquid chamber 25 through the screen perforations 20 drop into the annular spacing 16 and move into the sludge outlet pipe 34 for removal from the housing 10. The rate of sludge or solid pollutant removal from housing 10 is controlled by means of regulating valve 56 on the sludge removal pipe 34.

Suitable gasket means 40 secured in a channel of the screen member top wall 24 slidingly bears upon the opposed surface of the housing top wall 32 to provide a relatively fluid-tight fitting therebetween and preclude passage of sludge from annular spacing 16 through the screen member top wall opening 27 into the liquid chamber 25.

Passing through the housing top wall 32 and screen member top wall opening 27 is a vapor outlet pipe 36 which communicates at one end 37 with the liquid chamber 25 and at the other end with pump 38 for applying a vacuum or reduced pressure to the core region of the liquid chamber 25. The vacuum causes vaporization of the liquid within the liquid chamber 25 and withdrawal of the liquid vapor from the chamber 25 through the vapor outlet pipe 36. The vapor outlet pipe end 37 is preferably spaced from the perforate sidewall 18 closely adjacent the core or axial center of the liquid chamber 25, and the end 37 must be located at least above the liquid level in the liquid chamber 25, but preferably close thereto.

Vapors passing through pump 38 are exposed to atmospheric pressure and therefore condense and, as a result of condensation, produce some heat energy. Accordingly, cooling means generally designated by the numeral 42, such as a conventional heat exchanger having inlet port 44 and outlet port 46 for a circulating heat exchange medium, is provided between the pump 38 and the liquid discharge pipe 48 (as shown) or, alternatively, the pump 38 and the cooling means 42 are incorporated within a single pumping/condensing/cooling housing. It will be appreciated that the heat exchanger fluid may be used to supply heat to the liquid in the apparatus housing 10.

Also passing through the housing top wall 32 is a liquid inlet pipe 50 which has one end portion 52 adapted to receive a slurry or liquid containing solid and dissolved pollutants and the other end portion 53 discharging into the liquid chamber 25 at a point spaced radially outwardly from its axis. The polluted liquid is preferably charged on a substantially continuous basis into the liquid chamber 25 somewhat below the liquid level therein and, accordingly, one may have to deliver the polluted liquid at some positive pressure to preclude reverse flow of liquid into the inlet pipe end 53 from the liquid chamber 25. The liquid inflow rate for the system is controlled by means of a regulating valve 54 in the inlet pipe 50.

Because continuous vacuum distillation of liquid by itself may cause cooling of the remaining liquid in the liquid chamber 25 with a resultant increase in the liquid viscosity, and because the heat generated by the rapid rotation of the screen member 14 and the friction between the liquid and the vanes 28 will ordinarily be insufficient to compensate for such cooling, it is desirable to provide some mechanism by which heat can be positively introduced into the liquid chamber 25 above the effected through the rotational action so as to prevent excessive chilling of the liquid within the liquid chamber 25. In the preferred embodiment the means for heating the liquid is conveniently provided by the heat exchange conduit 58 passing through the housing top wall 32 and the screen member top wall opening 27 and extending into the liquid chamber 25. The now heated cooling medium leaving the heat exchanger outlet 46 is circulated through the heat exchange conduit 58 under pressure, entering through the annulus 59 and leaving through the inner pipe 61. The cooled medium leaving inner pipe 61 is then circulated back to cooling medium inlet 44 of the heat exchange 42. An advantage of using the cooling medium as the heating medium is the creation of an economical partially closed heating/cooling system. Alternate or additional means for heating the liquid to prevent excessive chilling thereof may include the direct injection of live steam or heated cooling medium or the use of electric heating elements within elements of the screen member 14.

As shown in FIG. 2, the housing top wall 32 has three openings therein through which pass liquid inlet pipe 50, vapor outlet pipe 36, and heat exchange conduit 58. The various pipes and conduits are arranged within the central region of liquid chamber 25 with the vapor outlet pipe 36 being centrally disposed and of greatest diameter, and the other pipes being further displaced from the central axis of the liquid chamber 25 but still sufficiently displaced from the perforate sidewall 18 as to avoid interfering with the action of the vanes 28. The vapor outlet pipe end 37 extends into the liquid chamber to a point closely spaced above the liquid surface while the heat exchange conduit 58 preferably extends almost to the base of the liquid chamber 25. The liquid inlet pipe end 53 is preferably located well below the liquid surface so as not to contaminate the relatively solid-free surface liquid in the process of being vacuum distilled. The arrangement of these pipes may, of course, be varied.

Briefly describing the operation of the purification apparatus, a polluted liquid from source 52 is introduced through regulating valve 54 into liquid inlet pipe 50, which discharges the polluted liquid beneath the liquid level in the liquid chamber 25. This polluted liquid is then trapped by the radially inwardly projecting vanes 28 of the rapidly rotating screen member 14 and thereby subjected to centrifugal action.

The relatively pure liquid will tend to be displaced towards the center and upper portion of the liquid chamber as a result of the centrifugal action, and therefore be most exposed to the vacuum about the centrally located vapor outlet pipe end 37 disposed above the liquid level. Accordingly, as a result of the cooperative simultaneous interaction of the centrifugal separation and the vacuum distillation, a relatively large pure liquid surface is exposed to the vacuum, thereby providing a high evaporation rate.

The vapors from the exposed liquid surface are drawn by pump 38 into the vapor outlet pipe 36 and, after passage through pump 38 where the vapors are condensed, the condensed liquid is cooled in heat exchanger 42 prior to being released as a substantially pure liquid at discharge pipe 48. In the course of time, the dissolved pollutants within the liquid will tend to accumulate within the liquid chamber 25, eventually supersaturating the liquid and precipitating out for disposal as a solid pollutant. The solid pollutants and some liquid are displaced outwardly by the centrifugal action from the liquid chamber 25 through the screen perforations 20 into the annular spacing 16, and thence flow into the sludge outlet pipe 34. This sludge, containing a high concentration of solid pollutants, may then be disposed of through incineration or other techniques compatible with the ecological purposes of the apparatus.

The various operating parameters may be varied within broad limits to determine and achieve optimal equilibrium conditions. Such operating parameters include the concentration, composition and inflow rate of polluted liquid, the rotational speed of the screen member, the operating temperatures within the liquid chamber, the rate of sludge removal, the level of vacuum applied to the liquid chamber, the degree of liquid fill in the liquid chamber, etc. Similarly, the structural characteristics of the purification apparatus may be varied; for example, the relative sizes and locations of the liquid inlet pipe 50, the sludge outlet pipe 34 and the vapor outlet pipe 36, the dimensions and shape of the screen member 14 and especially the perforations 20 thereof, the number, size and shape of the vanes 28, the width of the annular spacing 16, etc. Notwithstanding such structural and operating variations, the apparatus of the preferred embodiment essentially operates in a continuous, rapid and economical manner by simultaneously applying a vacuum over liquid within a vacuum distillation chamber while rapidly rotating the liquid about the chamber axis to centrifuge the solid pollutants out of the chamber through its perforate sides.

In other embodiments of the present invention, the vanes within the liquid chamber may have a scoop or pocket shape which opens in the direction of rotation for entrappingly engaging the polluted liquid for rotation therewith In another embodiment utilizing a functionally equivalent centrifuging technique, the radial vanes are secured to a rapidly rotating core element disposed within and concentric to a screen member which is itself stationary, the vanes extending radially outwardly towards the perforate screen sidewall to engage and centrifuge the liquid within the stationary screen member. In such an embodiment, the core element may include electric heating elements for introducing heat into the liquid chamber, thus obviating the need for heating element pipe 58. Additionally, the core element or a rotor shaft may be centrally cored to permit the introduction therethrough into the liquid chamber of polluted liquid from a pollution source, thereby obviating the need for a separate liquid inlet pipe 50.

Thus it can be seen from the foregoing detailed drawing and specification that the present invention provides a mechanical purification process and apparatus which will operate at high and economical purification rates to produce a substantially purified liquid from which both solid and dissolved pollutants have been substantially removed, with the removed pollutants being discharged from the processing area. The apparatus is of simple, rugged construction assuring a low initial cost and a minimum of maintenance problems.

Having thus described the invention, we claim:

1. Apparatus for the continuous mechanical purification of a liquid containing solid and dissolved pollutants comprising in combination:

a. a stationary housing having a generally cylindrical sidewall, bottom wall, and top wall;
b. a generally cylindrical screen member substantially concentrically disposed within said housing and of lesser diameter than the inner diameter of said sidewall to provide a spacing therebetween, said screen member having a perforate sidewall and a substantially imperforate base defining a liquid chamber therewithin;
c. inlet means in said housing communicating with said liquid chamber for substantially charging said liquid chamber with liquid containing solid and dissolved pollutants, said inlet means being at a point spaced radially outwardly from the axis of said screen member and inwardly from said screen member, the bottom of said inlet means being spaced from said top wall of said housing and adjacent the base of said screen member;
d. a plurality of vanes within said liquid chamber;
e. drive means for rapidly rotating at least said vanes about the axis of said screen member to cause said liquid within the liquid chamber to be centrifuged with the liquid being displaced inwardly within said screen member and the solid pollutants being displaced outwardly within said screen member and thence through said perforate sidewall into said spacing and with the dissolved pollutants in said displaced liquid remaining within said liquid chamber and concentrating therein until supersaturation effects precipitation thereof and displacement outwardly of said liquid chamber;
f. a sludge outlet in said housing adjacent the lower end thereof communicating with said spacing between said screen member and said housing sidewall to effectuate the discharge of said pollutants from said spacing through said sludge outlet;
g. vacuum means operable for generating a vacuum;
h. a vapor outlet in said housing top wall communicating at one end with said liquid chamber at a point adjacent the axis of said perforate sidewall and at the other end with said vacuum means for applying and maintaining the vacuum generated by said vacuum means within said liquid chamber to cause said displaced liquid to be preferentially exposed to the vacuum generated by said vacuum means with the vapors from said displaced liquid to be drawn through said vapor outlet;
i. means for supplying liquid containing solid and dissolved pollutants substantially continuously to said inlet means;
j. heating means in said chamber for continuously heating the contents of said liquid chamber; and means between said screen member and housing top wall to prevent solid pollutants from reentering the liquid chamber.

2. The apparatus of claim 1 wherein said screen member is mounted for rotation about its axis within said housing, wherein said vanes are affixed to said screen member and extend inwardly from said perforate sidewall towards the screen member axis, and wherein said drive means rotates said screen member and said vanes about the screen member axis.

3. The apparatus of claim 1 wherein said heating means passes through said housing top wall and extends downwardly through said liquid chamber to a point adjacent the lower end thereof.

4. The apparatus of claim 1 additionally including condensing means communicating with said vapor outlet for condensing vapor distilled from said liquid chamber, and means for discharging the condensate from said condensing means.

5. The apparatus of claim 1 wherein said means between said screen member and housing top wall comprises gasket means.

6. A method for the continuous mechanical purification of a liquid containing dissolved and solid pollutants comprising the steps of:
a. continuously charging a liquid chamber with a feedstock liquid containing solid and dissolved pollutants at a point below the liquid level in said chamber and at a point spaced outwardly from the axis of said chamber;
b. subjecting said polluted liquid within said liquid chamber to centrifugal acceleration by rapidly rotating said polluted liquid about the axis of said liquid chamber to displace said solid pollutant outwardly and to displace liquid inwardly toward said axis;
c. simultaneously subjecting said displaced liquid to vacuum distillation by applying a vacuum to the central portion of said liquid chamber and above the liquid level therein to produce liquid vapor;
d. heating said polluted liquid and displaced liquid within said liquid chamber;
e. withdrawing said liquid vapor from said liquid chamber;
f. condensing said withdrawn liquid vapor as a substantially pure liquid; and
g. removing sludge comprised of said outwardly displaced solid pollutants.

7. The method of claim 6 wherein said liquid vapors withdrawn from said liquid chamber are passed in heat exchange contact with heat exchange medium used to heat the displaced liquid and polluted liquid within the liquid chamber.

* * * * *

PO-1050
(5/69)

UNITED STATES PATENT OFFICE
CERTIFICATE OF CORRECTION

Patent No. 3,837,491          Dated     September 24, 1974

Inventor(s) Gerald Francis Humiston et al

It is certified that error appears in the above-identified patent and that said Letters Patent are hereby corrected as shown below:

Column 7, line 54 before "means" insert --k.--;

Column 8, line 34, "pollutant" should be --pollutants--.

Signed and sealed this 17th day of December 1974.

(SEAL)
Attest:

McCOY M. GIBSON JR.
Attesting Officer

C. MARSHALL DANN
Commissioner of Patents